United States Patent
Li et al.

[11] Patent Number: 5,552,245
[45] Date of Patent: Sep. 3, 1996

[54] MODIFIED ELECTROLYTE FOR ELECTROCHEMICAL CELLS AND CELLS USING SAME

[75] Inventors: Changming Li, Vernon Hills; Keryn Lian, Northbrook; Lijun Bai, Vernon Hills; Joseph G. Kincs, Arlington Heights, all of Ill.

[73] Assignee: Motorola Inc., Schaumburg, Ill.

[21] Appl. No.: 560,613

[22] Filed: Nov. 20, 1995

Related U.S. Application Data

[62] Division of Ser. No. 396,991, Mar. 1, 1995.

[51] Int. Cl.$^6$ .................................................. H01M 6/04
[52] U.S. Cl. ..................... 429/188; 429/206; 429/207; 429/195; 429/218; 429/223; 361/502; 361/503; 361/504; 361/505; 361/508; 361/516
[58] Field of Search ........................... 429/188, 206, 429/207, 195, 218, 223; 361/502, 503, 504, 505, 508, 516

[56] References Cited

U.S. PATENT DOCUMENTS

| | | | |
|---|---|---|---|
| 4,251,607 | 2/1981 | Yamaki et al. | 429/194 |
| 4,605,603 | 8/1986 | Kanda et al. | 429/59 |
| 5,082,642 | 1/1992 | Bickar et al. | 423/402 |
| 5,130,493 | 7/1992 | Schnatterer et al. | 568/432 |
| 5,388,025 | 2/1995 | Davis et al. | 361/502 |

*Primary Examiner*—Bruce F. Bell
*Attorney, Agent, or Firm*—Kenneth M. Massaroni

[57] ABSTRACT

An electrolyte system for use in an electrochemical cell such as a battery or capacitor, and which includes an aqueous electrolyte and a modifier species. The modifier should be adapted to act as a surfactant, as well as reduce oxidation of the electrode materials in the electrochemical cell. The aqueous electrolyte may be, for example, KOH, and the modifier species may be a porphine or porphine derivatives.

11 Claims, 5 Drawing Sheets

MODIFIED ELECTROLYTE FOR ELECTROCHEMICAL CELLS AND CELLS USING SAME

This is a divisional application of pending U.S. patent application Ser. No. 08/396,991, filed on Mar. 1, 1995, and assigned to Motorola, Inc.

TECHNICAL FIELD

This invention relates in general to electrolytes for electrochemical cells and more particularly to aqueous electrolytes for such cells.

BACKGROUND

There has been a great deal of interest in developing better and more efficient methods for storing energy for applications such as radio communication, satellites, portable computers, and electric vehicles to name but a few. Accordingly, there has been recent concerted efforts to develop high energy, cost effective batteries and electrochemical capacitors having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being regenerated (i.e., recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Electrolytes are typically either liquid electrolytes as found in conventional wet cell batteries or solid films as are available in newer, more advanced battery systems. Each of these systems have advantages, though they have inherent limitations which make them unsuitable for particular applications. Liquid or aqueous electrolyte systems have heretofore been preferred over other systems as the ionic conductivity of aqueous electrolytes are significantly higher than their solid counterparts. Moreover, liquid electrolytes can more completely encircle the electrodes providing greater surface contact and hence improved electrochemical performance.

While liquid electrolytes are currently preferred over their solid counterparts, liquid electrolytes continue to have certain inherent limitations which make them unsuitable in various applications. For example, upon repeated cycling of a rechargeable battery, electrolytes tend to promote the formation of a passivation layer on electrode surfaces exposed to the electrolyte. This is particularly true of conventional potassium hydroxide (KOH) electrolytes. Moreover, certain electrode materials such as oxide containing electrode materials, have generally poor conductivity in conventional electrolyte systems, and hence the power density of energy storage systems into which such electrodes are incorporated is lower than optimal. Improvements in both of these areas could substantially increase performance of electrochemical cells.

Accordingly, there exists a need to improve current electrolyte systems so as to catalyze the electrode surface to diminish or minimize the passivation process and improve the rechargeability of the electrode. Moreover, improved electrolyte systems should be capable of improving conductivity and hence increasing power density of energy storage systems employing electrode materials with inherently poor conductivity.

DETAILED DESCRIPTION OF THE PREFERRED EMBODIMENT

Figure 1:
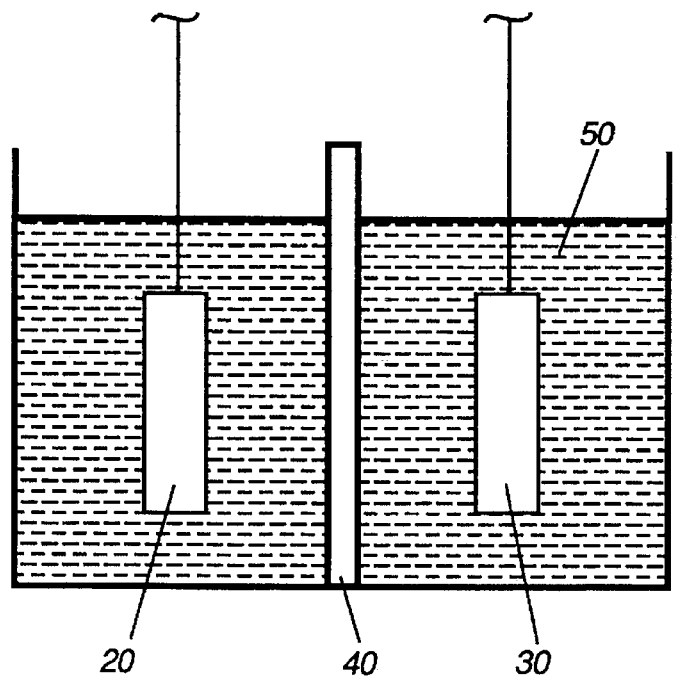
FIG. 1 is a representation of a high energy density electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of a high energy density aqueous electrochemical charge storage device 10 including an electrolyte system in accordance with the instant invention. The device 10 may be, for example, a battery or electrochemical capacitor, and includes an anode 20, a cathode 30, and a separator 40 operatively disposed between the anode and the cathode. According to industry convention, the cathode is defined as the positive electrode, and the anode is the negative electrode during the discharging process. The roles are then reversed during the charging process. Thus, references herein to the "cathode" refer to the electrode serving as the cathode during discharge; and references to the "anode" refer to the electrode serving as the anode during discharge.

Also disposed between the anode 20 and the cathode 30 is an electrolyte 50 which is illustrated in FIG. 1 as an aqueous (liquid) electrolyte disposed entirely above both the anode 20 and the cathode 30. The electrolyte system will be described in greater detail hereinbelow.

The anode material may be fabricated from any of a number of different materials known in the art, examples of which include, but are not limited to, zinc, bismuth, cadmium, their corresponding alloys, oxides, sulfides, tellerides, and combinations thereof. Alternatively, the anode may be fabricated of indium or an indium alloy material. Indium possesses high energy density and high power density; moreover, indium has a relatively high negative anodic potential (−1.15 volts vs. Hg/HgO electrodes) and high theoretical capacity (0.7 Ah/g).

However, indium has heretofore been unuseable as a rechargeable electrode because the charge storage mechanism was irreversible. This was believed to be due to the function of an oxide passivation layer on the indium electrode during the charge/discharge process. The cathode 30 may be fabricated from any of a number of known materials which are compatible with the anode material selected. Examples of such a preferred cathode materials include, but are not limited to Ni, Mn, Co, Mo, Pb, Cr, Ag, and oxides and hydroxides of the same and combinations thereof. Alternatively, and in one preferred embodiment, the cathode may be fabricated of a nickel alloy materials such as that described in commonly assigned, co-pending U.S. patent application Ser. No. 08/322,130 entitled "NICKEL ALLOY ELECTRODES FOR ELECTROCHEMICAL DEVICES", the disclosure of which is incorporated herein by reference. More particularly, the alloy material described in the aforementioned U.S. patent application are modified nickel, molybdenum, chromium alloys in which the host matrix of nickel-molybdenum-chromium alloy is typically between 70 and 100% of the total composition of the electrode material.

The electrolyte (50) is an electrolyte system including an electrochemically active species having a modifier added thereto. The modifier is adapted to act as a surfactant which surfactant improves the chargeability of the electrochemical dell into which the electrolyte system is incorporated. As a result, the improved electrolyte system allows for increased power density and cycle life in electrochemical devices. The electrolyte system specifically includes an alkaline electrochemically active species or electrolyte such as potassium hydroxide (KOH), NaOH, LiOH, $NH_3OH$, and a soluble porphine or metal porphine modifier and/or derivatives thereof added to the alkaline electrolyte.electrochemically active species.

Figure 2:
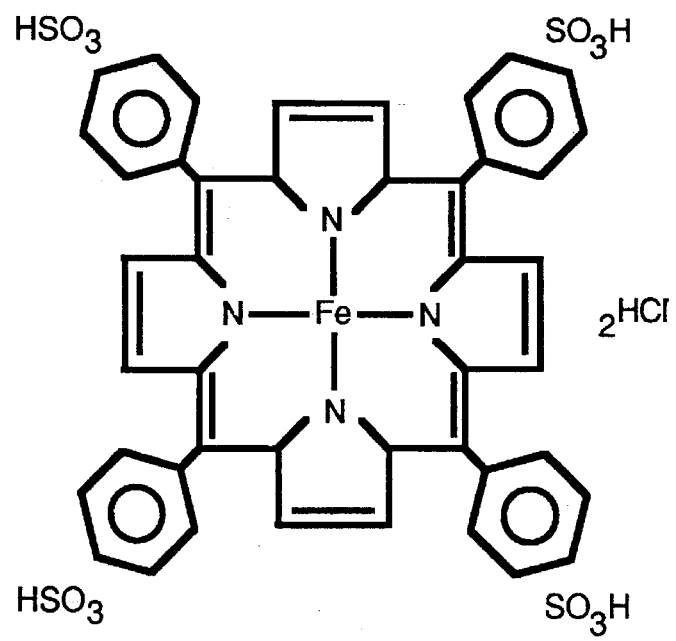
FIG. 2 is an illustration of the chemical structure of an iron mesotetra(sulfonatophinyl) porphine, in accordance with the instant invention.

Porphines are well known complexes in analytical chemistry and are known for their ability to coordinate transitional metal ions. Referring now to FIG. 2, there is illustrated therein the chemical structure of iron meso-tetra(sulfonatophinyl) porphine. As may be appreciated from a perusal of FIG. 2, the base structure of most porphines is a central ion, in this case iron, having six coordination positions, four of which are complexed with four nitrogen coordinated macracyclic compounds, specifically pyroles. The two remaining coordination positions allow the porphine to coordinate some reactants and/or to be absorbed chemically into different material surfaces such as the electrode surface of battery electrodes. This characteristic allows the porphine modifier to adhere to the surface of the electrodes and reduce oxidation thereof.

The four nitrogens on the macrocyclic compounds have coordination capacity which can chemically bind other chemical species or may be chemically absorbed into different material surfaces. Therefore, the porphine and/or metal porphine can act as a surfactant. The porphines used in the instant electrolyte system may be of the metal porphine type and specifically soluble metal porphine types such as that illustrated in FIG. 2. The macrocyclic ring of the porphine can have various functional groups and thus alter its surfactant properties. The porphine illustrated in FIG. 2, shows the chemical structure of iron meso-tetra(sulfonatophinyl) porphine with an iron central ion: However, other transition metal ions can be complexed into the porphine macrocyclic structure. Examples of such other metal ions include, but are not limited to, Zn, Co, Cr, Ni, Mo, Mg, Cu and combinations Mn. Since other transition ions can be complexed into the porphine macrocyclics, this allows one to tailor the compound for matching different electrode surfaces in an energy storage system. The compound illustrated in FIG. 2, also has four sulfonatophenyl functional groups and $HSO_3$—groups which allow the compound to be soluble in water. It may therefore be used as an additive in a liquid electrolyte for use in energy storage systems.

The macrocyclic compounds of the porphines involve highly conjugated organic structures with delocalized $\pi$ electrons. As an absorption layer or solid, porphines or metal porphines have extremely good electronic conductivity. This characteristic is essential to good behavior as a surface electrocatalyst for electrodes.

EXAMPLES

In order to demonstrate the behavior of porphine and metal porphines as surfactants or catalysts for improving the electrochemical behavior of an electrolyte species in an electrochemical system, the following experiments were carried out. A 0.1% iron meso-tetra(sulfonatophinyl) porphine was prepared with distilled water. All experiments were carried out in 31 wt% KOH at room temperature. The reference electrode used in each of the examples was a Hg/HgO electrode in a 31 wt% KOH solution and the counterelectrode was a nickel screen.

Example I

Figure 3:
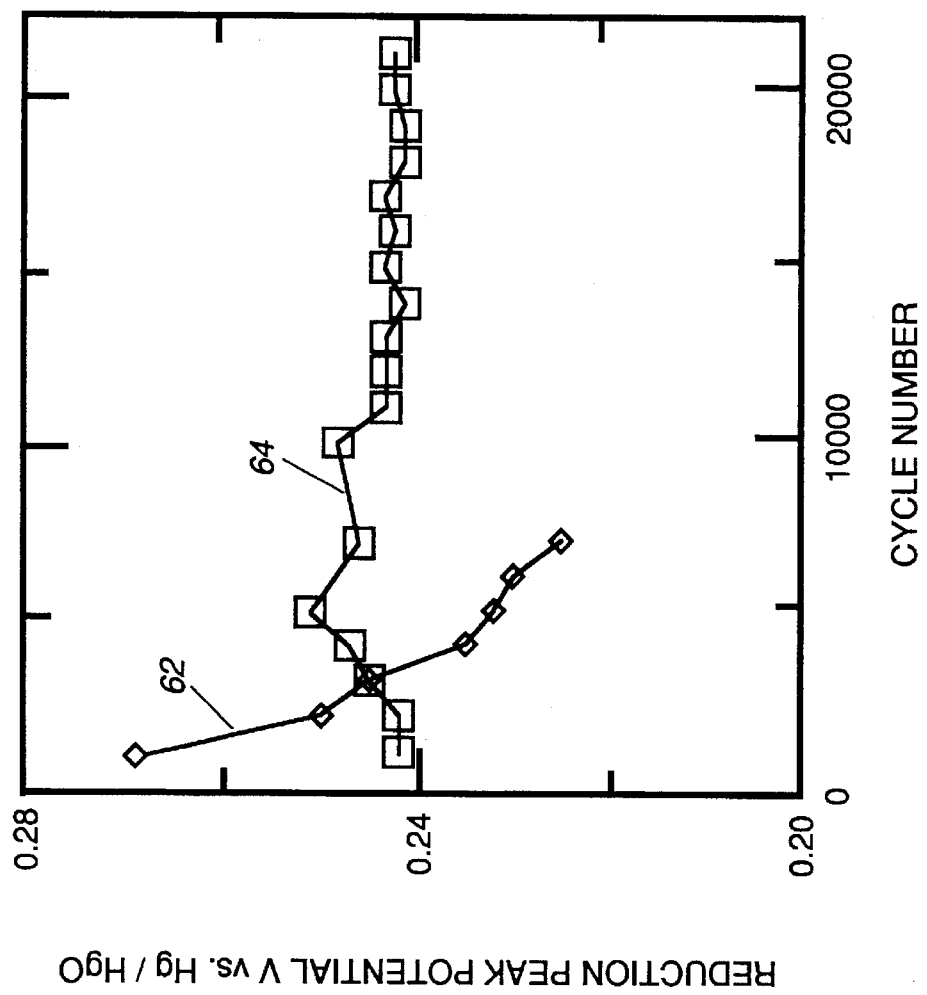
FIG. 3 is a chart illustrating cycle life performance characteristics for an electrochemical cell employing an electrolyte system in accordance with the instant invention.

In a first example, an electrochemical cell was prepared with a nickel molybdenum chromium alloy cathode having the composition $Ni_{58.5}CR_{21}Mo_{13.5}W_3Fe_4$ foil electrode in 31% KOH electrolyte. FIG. 3 illustrates the results of cycle life testing using 31% KOH electrode with and without iron meso-tetra(sulfonatophinyl) porphine modifier. Specifically, test results for an electrolyte without the porphine additive are illustrated by line 62, while test results for a system including the porphine additive are illustrated by line 64. As may appreciated from a perusal of FIG. 3, the system without the porphine additive degraded substantially after approximately 5000 cycles. Conversely, the system including the porphine modifier additive continued to perform consistently to approximately 20,000 cycles at which point testing was terminated.

Figure 4:
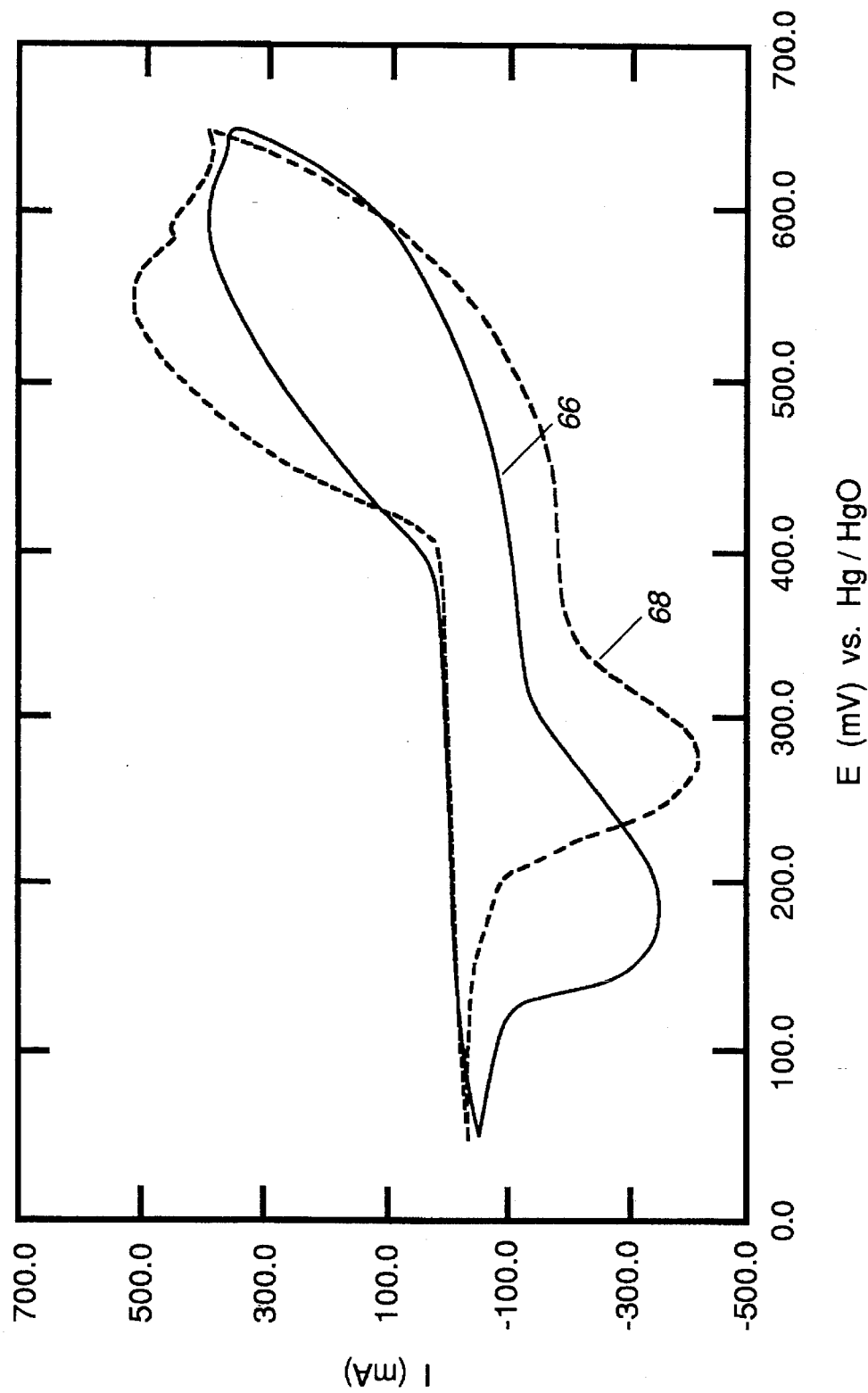
FIG. 4 is a cyclic voltammagram for an electrochemical cell including an electrolyte system in accordance with the instant invention as compared to an electrochemical cell with an electrolyte system according to the prior art.

Further evidence of the benefit of the porphine modified electrolyte system is illustrated in FIG. 4. Specifically, after approximately 50,000 cycles in an electrolyte without the porphine additive, the nickel molybdenum chromium alloy electrode showed an increase in the anodic/cathodic peak separation of approximately 200 m/V. This is illustrated by line 66 of FIG. 4. This deterioration results in a kinetically retarded redox reaction and decreased rechargeability of the system. After 50,000 cycles, approximately 0.05 ml of porphine additive was added to the 5 ml of KOH electrolyte. Cell performance showed immediate significant improvement. Specifically both anodic and cathodic peak potentials shifted toward more versatile potentials, i.e., peak separation was decreased and recharge efficiency increased remarkably as is illustrated by line 68 of FIG. 4, which shows the CV curve taken for the same electrode in the porphine modified electrolyte system after approximately 100,000 cycles. Thus, the iron porphine was shown to act as a surface catalyst to improve reversibility of the existing material and as a surfactant to catalyze the redox reaction minimizing passivation, and correcting surface defects with the end results being enhancement of the electrode cycle life.

Example II

Figure 5:
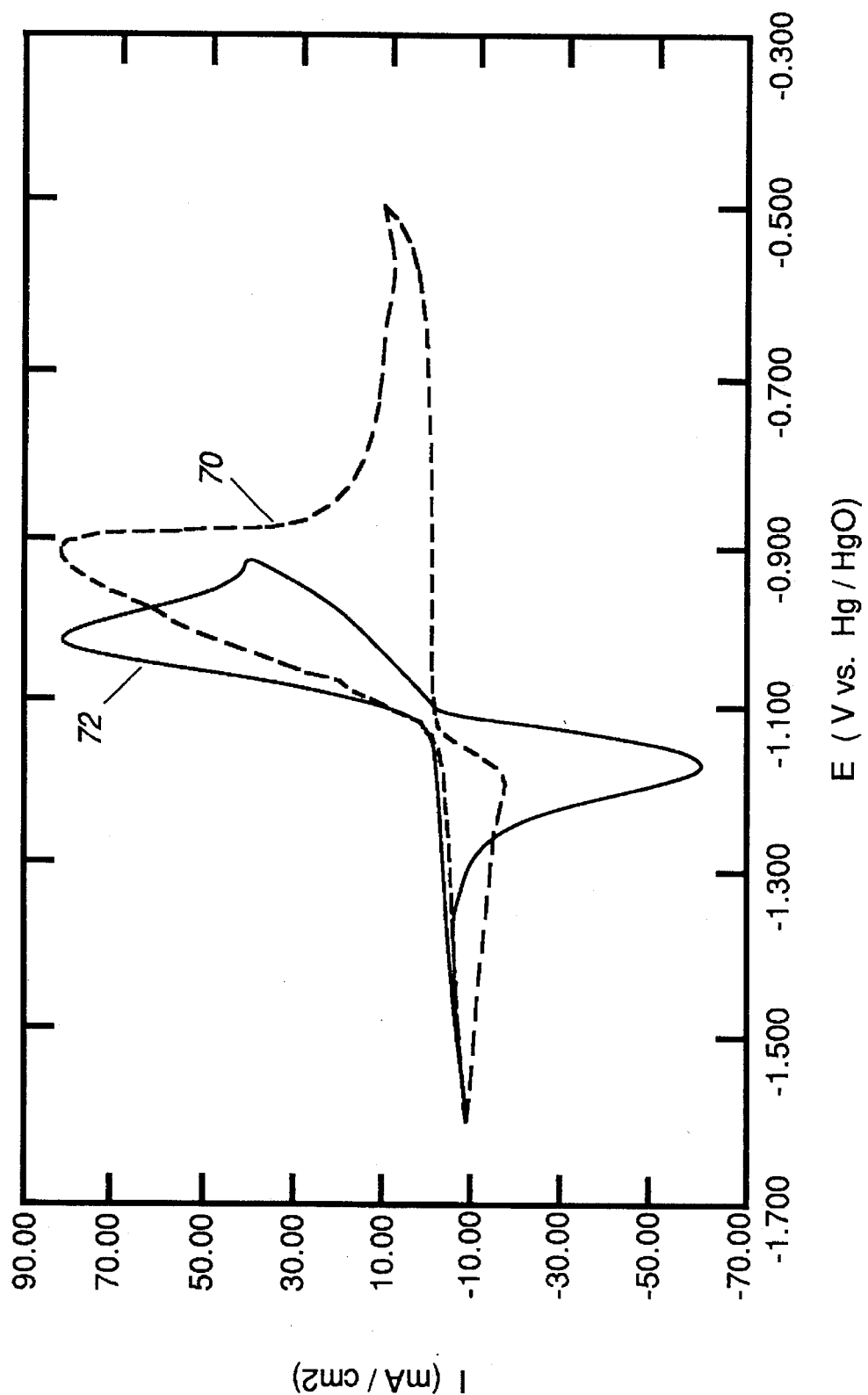
FIG. 5 is a cyclic voltammagram for an electrochemical cell including an indium electrode and an electrolyte system in accordance with the instant invention.

A second electrochemical cell was fabricated using an indium anode, and reference and counter electrodes as described hereinabove. The electrolyte system used in this example was a 31% KOH solution containing 0.001% iron meso-tetra(sulfonatophinyl) porphine. The indium anode was an indium foil layer having a thickness of 50 μm. Referring now to FIG. 5, there is illustrated therein the CV curves of indium electrode in 31% KOH electrolyte with and without the porphine modifier. The indium electrode demonstrates very negative anodic redox potential (−1.15 volts vs. Hg/HgO) and high theoretical capacity. The performance of the indium electrode without the porphine modifier is illustrated by line 70, while with the porphine modifier is illustrated by line 72. As may be appreciated from a perusal of FIG. 5, the electrochemical reaction of indium is not reversible as shown by line 70. It is hypothesized that irreversibility is due to the passivation of the indium during the oxidation process. However, after the addition of 0.05 ml of 0.1% iron meso-tetra(sulfonatophinyl) porphine to 10 ml of KOH electrolyte the reaction became reversible as illustrated by line 72. It is hypothesized that the porphine modifies the surface of the indium electrode and prevents the formation of a passivation film. Further, the porphine catalyzes the redox reaction of the indium electrode accelerating the reduction of the indium oxide. The CV curve illustrated in line 72 was taken at 100 mV/sec and indicates the indium electrode has faster charge/discharge rates resulting in a high power density.

Figure 6:
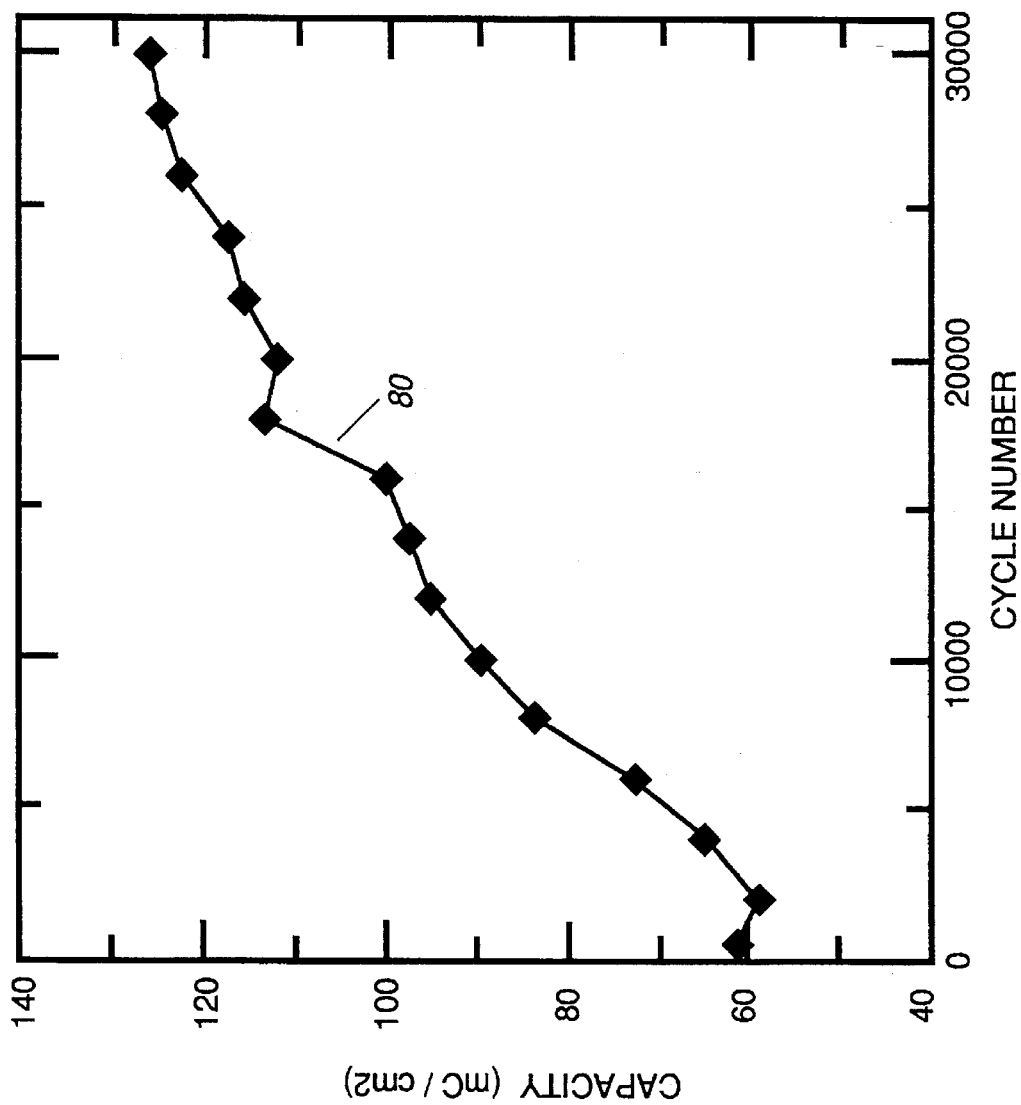
FIG. 6 is a chart illustrating cycle life performance for the electrochemical cell of FIG. 5.

Referring now FIG. 6, there is illustrated therein cycle life tests for the indium foil electrode in the 31% KOH:0.01% porphine modifier electrolyte system. As may be appreciated by a perusal of FIG. 6, line 80 illustrates that capacity is increased with the number of cycles. Hence capacity at additional testing is approximately 60 mC/cm$^2$ but climbs to over 120 mC/cm$^2$ by the time 30,000 cycles have been performed. Hence, the indium electrode/KOH porphine modified electrolyte system demonstrates acceptable cycle life.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical charge storage device comprising:

an anode;

a cathode; and an aqueous electrolyte system comprising an electrolyte species and a porphine modifier species.

2. An electrochemical charge storage device as in claim 1, wherein said electrolyte species is an alkaline electrolyte.

3. An electrochemical charge storage device as in claim 2, wherein said alkaline electrolyte species is KOH.

4. An electrochemical charge storage device as in claim 1, wherein said porphine modifier species is a metal porphine.

5. An electrochemical charge storage device as in claim 4, wherein said metal porphine has a central transition metal ion.

6. An electrochemical charge storage device as in claim 4, wherein said metal porphine is an iron meso-tetra(sulfonatophinyl) porphine.

7. An electrochemical charge storage device as in claim 1, wherein said cathode is fabricated of a Ni-Mo-Cr alloy.

8. An electrochemical charge storage device as in claim 1, wherein said anode is fabricated of indium.

9. An electrochemical charge storage device having a cathode, an anode fabricated of indium and an electrolyte system including an alkaline electrolyte and a metal porphine modifier.

10. An electrochemical charge storage device as in claim 9, wherein said metal porphine has a central transition metal ion.

11. An electrochemical charge storage device having a cathode as in claim 9, wherein said metal porphine is an iron meso-tetra(sulfonatophinyl) porphine.

\* \* \* \* \*